United States Patent [19]

Fäger

[11] Patent Number: 4,760,997
[45] Date of Patent: Aug. 2, 1988

[54] FIXING DEVICE FOR HEAVY COMPONENTS, ESPECIALLY ENGINES

[75] Inventor: Gunnar Fäger, Skövde, Sweden

[73] Assignee: AB Volvo, Gothenburg, Sweden

[21] Appl. No.: 831,426

[22] Filed: Feb. 20, 1986

[30] Foreign Application Priority Data

Feb. 26, 1985 [SE] Sweden ............................. 8500940

[51] Int. Cl.[4] .............................................. B23Q 1/04
[52] U.S. Cl. ...................................... 269/71; 269/309
[58] Field of Search ............... 269/71, 309, 60; 254/7; 414/589, 598, 600, 639, 648; 248/129

[56] References Cited

FOREIGN PATENT DOCUMENTS 392588 4/1977 Sweden .

Primary Examiner—Frederick R. Schmidt
Assistant Examiner—Judy J. Hartman
Attorney, Agent, or Firm—Young & Thompson

[57] ABSTRACT

The invention relates to a fixing device, especially intended to be used on a remote-controlled transport car for assembly of combustion engines. The fixing device comprises a first fixing plate carried by a turntable on the car, and a second fixing plate, connectable thereto, and intended to be mounted onto the flywheel housing gearbox plane of an engine block. The first fixing plate has keyhole-shaped cavities, into which pins on the other fixing plate fit. There is also a cooperating cam groove and follower which automatically lock the fixing plates together when the turntable is rotated from a predetermined position.

6 Claims, 2 Drawing Sheets

FIXING DEVICE FOR HEAVY COMPONENTS, ESPECIALLY ENGINES

The present invention relates to a fixing device for heavy components, such as e.g. engine blocks and complete engines, comprising a stand carrying a turntable by means of which the components can be rotated.

U.S. Pat. No. 4,018,343 discloses for installation of combustion engines the use of remote-controlled transport cars equipped with fixing devices of the above-mentioned type. In this case the turntable is made as an attachment plate to which the gearbox plane of the engine flywheel housing is fixed directly. The attachment plate is therefore provided with fastening means, the form and placement of which conform exactly to the particular type of engine to be assembled. In series assembly where the types of engines in a flow of engines are so varied as to the form of the gearbox planes that a single attachment plate can not be used for all types of engines, then different types of transport cars must be incorporated in the flow of engines.

The purpose of the present invention is in general to achieve a fixing device of the type described by way of introduction above, preferably carried by a remote-controlled car and adapted for the assembly of e.g. combustion engines, and which with the aid of a few simple standard accessories, can be used for a plurality of different engine types and which provide rapid and simple suspension of the engine.

This is achieved according to the invention by a fixing device of the above-mentioned type which is characterized in that a first fixing plate is solidly joined to the turntable, that a second fixing plate intended to first be attached to a component, e.g. to an engine block in its gearbox plane, is detachably joinable to the first fixing plate by means of cooperating locking means arranged on the plates, which means can be brought into interlocking engagement with each other by moving the plates towards each other followed by a lateral displacement of the plate relative to each other, and the second fixing plate has a first cam means which cooperates with a second cam means, so arranged that after on initial rotation of the turntable from a predetermined starting position, the plates are fixed in said laterally displaced position.

Among the advantages of the device according to the invention one should mention firstly the simple adaption to various types of engines merely by changing the second fixing plate and secondly the rapid hanging of the engine on the carrier (the transport car) by quick coupling combined with automatic locking after initial rotation of the turntable.

BRIEF DESCRIPTION OF THE DRAWINGS

Further characteristics and advantages of the invention will be evident from the following description with reference to an example shown in the accompanying drawings, wherein.

Figure 1:
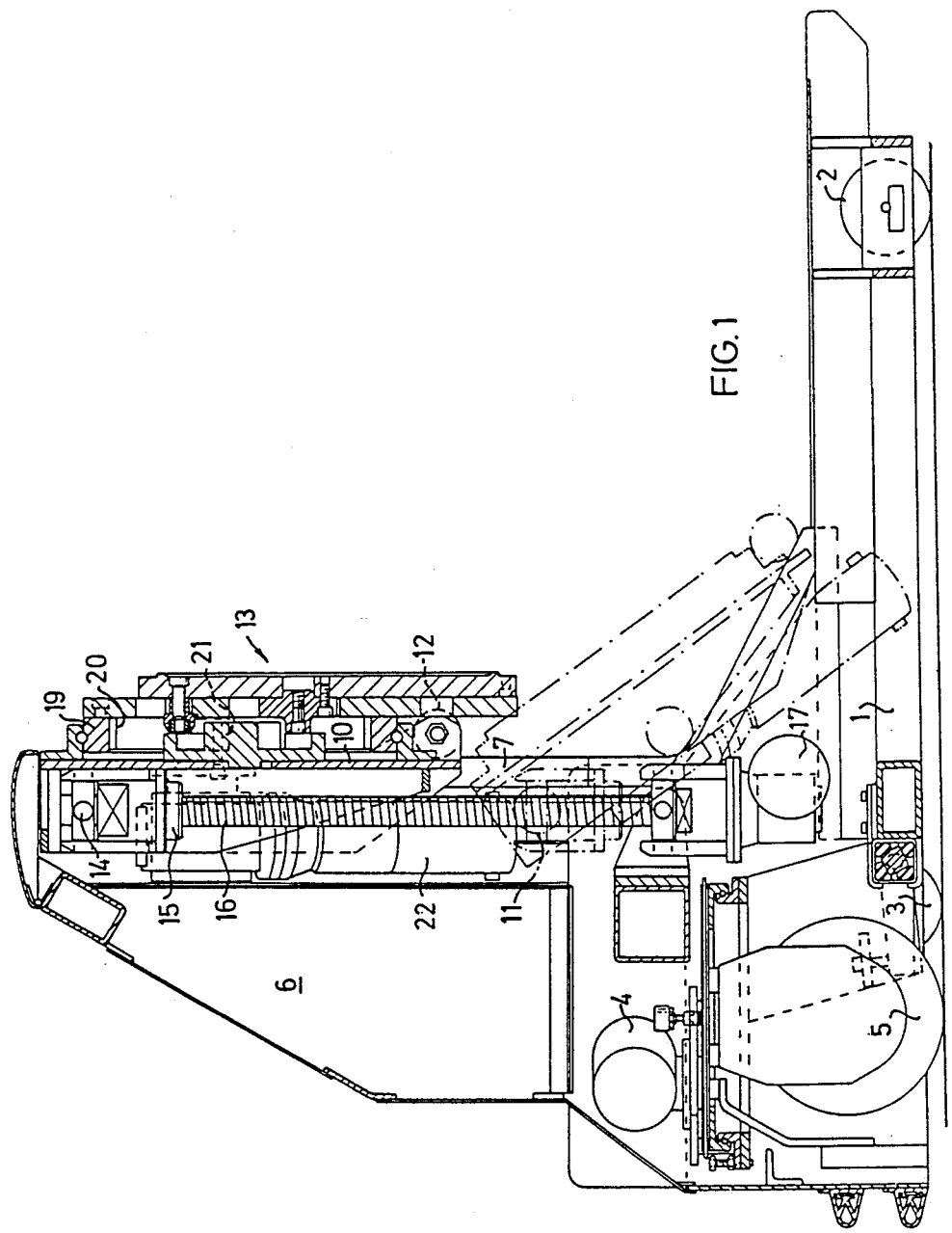
FIG. 1 shows a sideview of a fixing device according to the invention mounted on a transport car.

The car in FIG. 1 has a carriage 1 with a pair of fixed wheels 2, a pair of runners 3 and a wheel 5 steerable by a steering motor 4, which wheel is driven by a drive motor (not shown). The car is of a type which is remote-controlled in a known manner via signals from a control loop embedded in the floor. The undercarriage 1 of the car carries a stand (generally designated 6), on one side of which a pair of parallel rails 7 are mounted which serve as guides for a fixing carriage 10, which has an upper pair of wheels 11 running against the side of the rails facing away from the fixing carriage and a lower pair of wheels 12 running against the side of the rails facing the carriage to absorb the tipping moment which an engine attached to a fixing plate 13 mounted on the fixing carriage exerts on the fixing carriage. At its upper edge, the fixing carriage is joined via pivot shafts 14 to a ball-nut arrangement 15, which engages a screw 16 rotatably mounted in the stand, which screw is drivingly connected at its lower end with a motor 17.

The fixing device, generally designated 13, comprises a turntable 19, with an internal toothed rim 20 in engagement with a gear 21 which is driven via mitre gears by a drive motor 22 carried by the fixing carriage 10. A first fixing plate 30 is screwed securely to the turntable 19. The plate 30 is made with three keyhole-shaped through-cavities 31 and a large oval opening 32 placed centrally between them.

A second fixing plate 33 has pins 34 screwed securely thereto which are spaced according to the keyholes 31 in the first plate 30. The pins have a head 35 adapted to the broader circular portion of the hold 31 and a shaft 36 adapted to the width of the narrower oblong portion of the holes 31. Somewhat excentrically in relation to the centre point o defined by the pins 34, a circular plate 37 is mounted with a rotatable cam roller 38. Finally the plate 33 is provided with a number of through-holes 33a for attachment bolts for mounting the plate on the flywheel housing of an engine.

A cam member 39 is solidly mounted on the fixing carriage 10 itself behind the central opening 32 of the first fixing plate 30. This cam member is made with a circular cam groove 40 the centre point of which coincides with the centre of rotation of the turntable and the width of which is adapted to the diameter of the cam roller 38, so that it can roll with a slight play in the cam groove. At one location, the cam groove has a radially widened portion 41.

Figure 2:
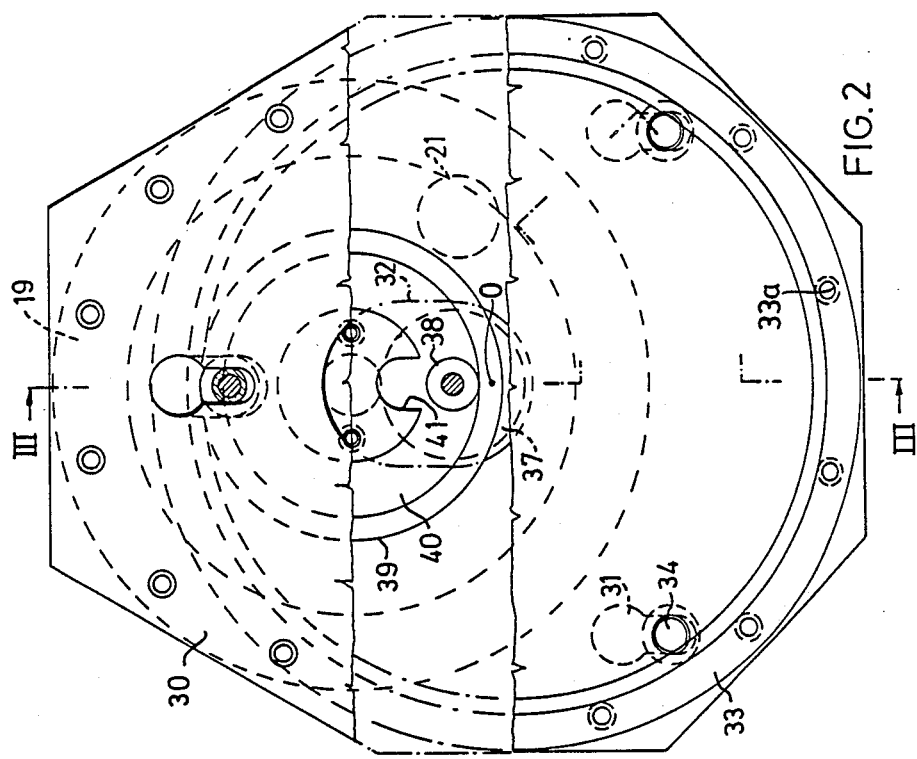
FIG. 2 shows a frontal view of the fixing device alone and FIG. 3 is a sectional view along the line III—III in FIG. 2.
Figure 3:
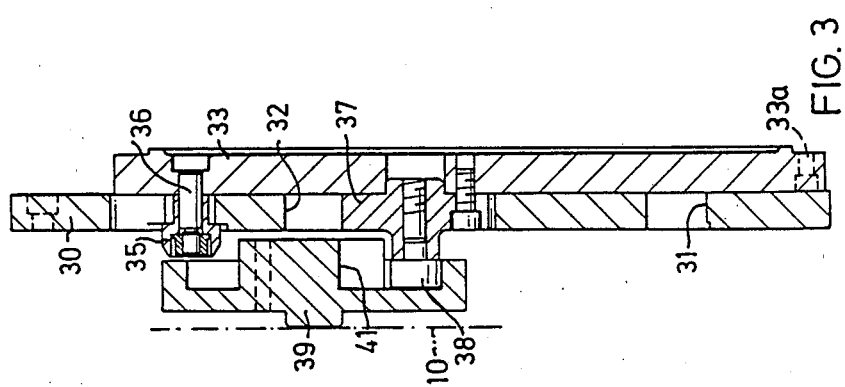

After mounting of the fixing plate 33 on the engine, the fixing plates 30,33 are coupled together to suspend the engine on the car. This is done by inserting the pins 34 into the upper circular portions of the keyholes 31, the cam roller 38 being simultaneously inserted into the radially broadened portion 41 of the cam groove 40. The fixing carriage 10 is then displaced slightly upwards so that the fixing plates assume the relative positions shown in FIGS. 2 and 3, in which the shafts of the pins 34 rest at the lower edges of the keyholes 31 at the same time as the cam roller 38 has been moved out into the circular cam groove 40. After a short initial rotation of the turntable 19 from the position shown, the interaction between the cam roller 38 and the cam groove 40 will lock the fixing plates to each other, meaning that the engine can be turned one complete rotation while preserving secure engagement. The arrangement thus eliminates the risk that the engine due to an oversight on the part of the assembly worker, could fall from the stand when the turntable is turned to positions in which the broader portions of the keyholes 31 are pointed downwards.

I claim:

1. Fixing devices for heavy components, comprising a stand carrying a turntable, by means of which the components can be rotated, a first fixing plate solidly joined to the turntable, a second fixing plate, means on said second fixing plate for detachably connecting said second fixing plate to a said component, first and second cooperating attachment means arranged respectively on said first and second plates for detachably joining the plates to each other, which first and second attachment means can be brought into engagement with each other by moving the plates in a first direction towards each other followed by a displacement of the plates relative to each other in a second direction perpendicular to said first direction into a predetermined starting position, the second fixing plate having a first cam means which cooperates with a second cam means on the stand, said first and second cam means being releasable locking means so arranged that after an initial rotation of the turntable and first and second plates from said predetermined starting position, the plates are releasably locked together.

2. Fixing device according to claim 1, characterized in that one fixing plate has keyhole cavities each having one relatively broad end and a relatively narrow slot and the other fixing plate has pins with relatively broad heads on relatively narrow shafts, said heads being of a size to enter said ends but being too big to pass through said slots and said shafts being of a size to enter said slots.

3. Fixing device according to claim 2, characterized in that the first fixing plate is provided with the cavities and the second fixing plate is provided with the pins.

4. Fixing device according to claim 1, characterized in that the first cam means is a cam follower and the second cam means is a cam groove for the cam follower, said groove being disposed concentrically to the rotational axis of the turntable in a turntable carrier, and that a radially inwardly directed cavity extends from the cam groove to receive the cam follower prior to the lateral displacement of the plates relative to each other.

5. Fixing device according to claim 4, characterized in that the turntable carrier is vertically displaceable on the stand and that said attachment means include keyhole cavities in the first fixing plate that extend vertically.

6. Fixing device according to claim 1, characterized in that the stand is mounted on a remote-controlled motor-driven transport car, particularly intended for use in assembly of e.g. combustion engines, gearboxes etc.

* * * * *